Nov. 6, 1951     C. J. STONE, SR     2,574,300
VENEER GAUGE
Filed Oct. 12, 1949
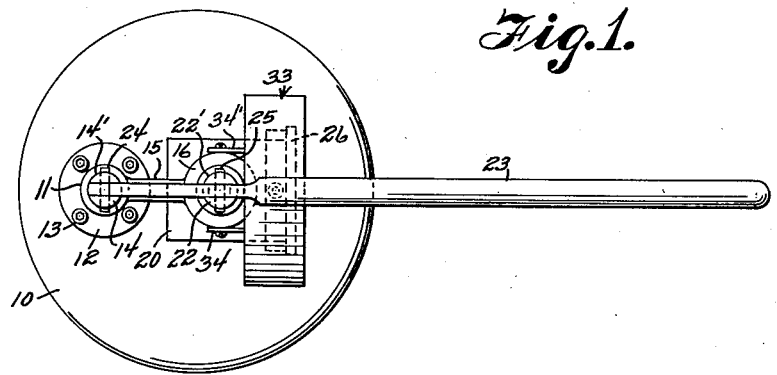
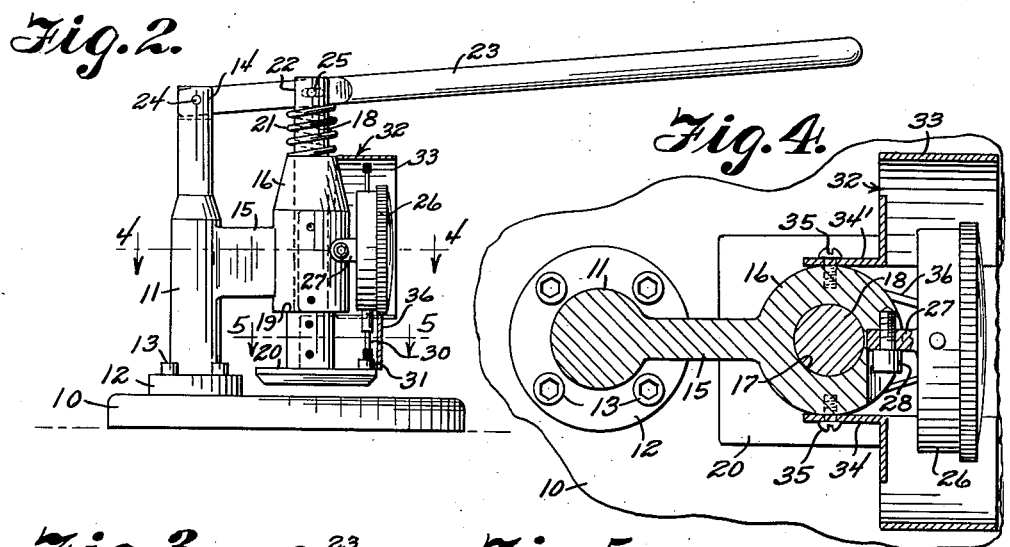
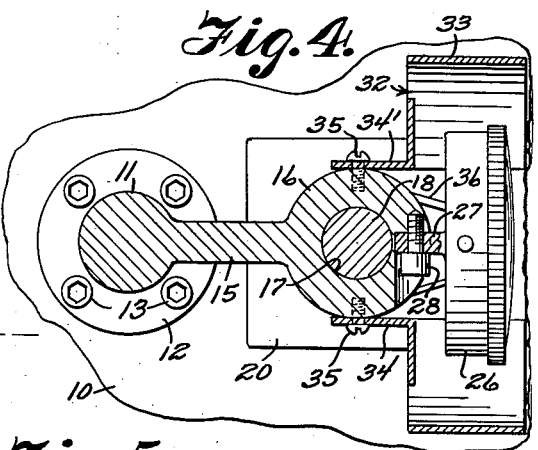
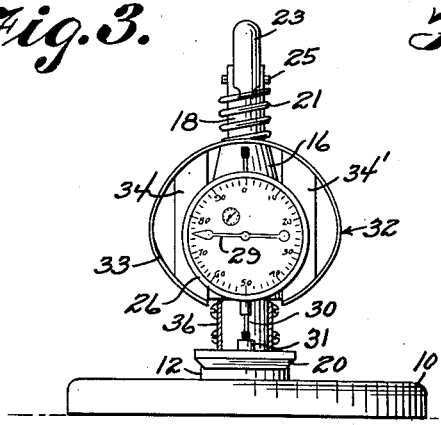
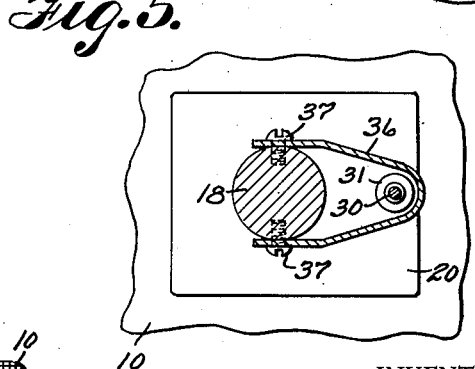
INVENTOR.
Cecil J. Stone, Sr.
BY Victor J. Evans & Co.
ATTORNEYS Patented Nov. 6, 1951

2,574,300

UNITED STATES PATENT OFFICE 2,574,300

VENEER GAUGE

Cecil J. Stone, Sr., Bristol, Tenn.

Application October 12, 1949, Serial No. 121,019

1 Claim. (Cl. 33—147)

This invention relates to a machine for gauging or measuring thickness of materials, and more particularly to a machine for determining the thickness of lumber, veneer, or the like.

The object of the invention is to provide a machine which is adapted to be manually operated in order to readily and accurately determine the thickness or gauge of lumber, veneer or other materials.

Another object of the invention is to provide a thickness testing machine which includes a manually operable means for moving a platen into engagement with the article to be measured whereby a calibrated instrument or gauge is actuated to give the operator an accurate indication of the thickness of the article being measured.

A further object of the invention is to provide a gauging device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the measuring apparatus, according to the present invention;

Figure 2 is a side elevational view of the apparatus, with parts broken away and in section;

Figure 3 is a front elevational view of the apparatus, with parts broken away and in section;

Figure 4 is an enlarged sectional view taken on the line 4—4 of Figure 2; and

Figure 5 is an enlarged sectional view taken on the line 5—5 of Figure 2.

Referring in detail to the drawings, the numeral 10 designates a horizontally disposed base which has projecting upwardly therefrom a vertically disposed post 11. The post 11 is provided with an annular flange 12 on its lower end, and a plurality of securing elements 13 serve to connect the flange 12 to the base 10. The upper end of the post 11 is cut away to define a pair of spaced parallel ears 14 and 14' for a purpose to be later described.

A horizontally disposed brace 15 has one end secured to the post 11, as by welding, and the other end of the brace 15 is secured to a vertically disposed shell or casing 16. The casing 16 is provided with a longitudinally extending bore 17 therein. Slidably arranged in the bore 17 is a vertically disposed shaft or stem 18. The shaft 18 is cut away to define a shoulder 19 adjacent its lower end, and the shoulder 19 is adapted to abut or contact the bottom of the casing 16 for limiting upward movement of the shaft 18.

Secured to the bottom of the shaft 18 is a platen 20, and the platen 20 is mounted for movement towards and away from the base 10. A coil spring 21 is circumposed on the shaft 18 adjacent the upper end thereof, for normally urging the shaft 18 upwardly and the platen away from the base 10.

The upper end of the shaft 18 is cut away to define a pair of spaced parallel ears 22 and 22'. For moving the platen 20 toward the base 10, a handle 23 is provided. The handle 23 has one of its ends interposed between the ears 14 and 14' and is connected thereto by a pivot pin 24. Further, a portion of the handle 23 is positioned or interposed between the ears 22 and 22' on the upper end of the shaft 18, and a pin 25 passing through the elongated slot 25' in the handle 23 pivotally connects the handle 23 to the shaft 18. The slot 25' in the conventional manner permits sufficient play or clearance at the pivot 25 to prevent binding of the shaft 18 in the casing 16.

For indicating the thickness of the article, such as the sheet of lumber or veneer, being tested, an instrument or calibrated gauge 26 is provided. The gauge 26 includes a lug 27 that is secured to the casing 16 by a suitable securing element, such as a bolt and nut assembly 28. The gauge 26 is conventional and includes a moveable pointer 29, Figure 3, that is adapted to coact with a calibrated scale to indicate the thickness of the article being tested. The gauge 26 is provided with an actuating stem 30. The gauge 26 is constructed so that as the platen 20 is moved downwardly by means of the handle 23, the stem 30 will move downwardly by force of gravity to thereby actuate the gauge 26. The lower end of the stem 30 is supported on a head 31 that is secured to the upper surface of the platen 20.

For protecting the gauge 26 against accidental damage thereto, a shield or guard 32 is provided. The shield 32 includes an annular rim 33 that surrounds the gauge 26, and the shield further includes a pair of spaced parallel legs 34 and 34' that are secured to the casing 16 by screws 35. Further, a substantially V-shaped shield or guard 36 is secured to the lower end of the shaft 18 by screws 37 and the shield 36 serves to protect the stem 30 from accidental damage.

In use, the article, such as a piece of wood or veneer to be measured is positioned on the base 10 between the base and the platen 20. Then, the user grips the handle 23 and exerts a downward pressure thereon to thereby move the shaft 18 downwardly whereby the platen 20 will move into engagement with the upper surface of the article being tested. As the platen 20 moves downwardly, the actuating stem 30 of the gauge 26 moves downwardly by gravity, whereby the pointer 29 will be actuated so that the instrument 26 will indicate the gauge or thickness of the article being tested. As soon as the pressure is released on the handle 23, the coil spring 21 will urge the shaft 18 and the platen 20 upwardly away from the base 10 whereby the article can be removed from the apparatus so that the apparatus is ready to receive the next article to be measured.

What I claim:

In a device for measuring the thickness of articles, a horizontally disposed base, a vertically disposed post projecting upwardly from said base and secured thereto, a horizontally disposed brace having one end connected to said post intermediate the ends thereof, a hollow casing spaced from said post and supported by said brace, a vertically disposed shaft slidably arranged in said casing, a horizontally disposed platen secured to the lower end of said shaft and mounted for movement toward and away from said base, there being a shoulder on the lower end of said shaft adapted to engage said casing for limiting upward movement of said shaft, a handle pivotally connected to the upper end of said post and shaft for moving said platen towards said base, a coil spring circumposed on said shaft and engaging said handle for urging said platen away from said base, an indicating instrument, a lug on the rear of said indicating instrument, means passing through said lug into said casing whereby said indicating instrument is supported by said casing, an operating stem carried by the indicating instrument and actuated upon movement of said platen.

CECIL J. STONE, Sr.

REFERENCES CITED

The following references are of record in the file of this patent:

UNITED STATES PATENTS

| Number | Name | Date |
|---|---|---|
| 564,235 | Tidd | July 21, 1896 |
| 904,560 | Pierpont | Nov. 24, 1908 |
| 2,000,057 | Arnold | May 7, 1935 |
| 2,095,226 | Bohn | Oct. 12, 1937 |
| 2,134,184 | Guyer | Oct. 25, 1938 |
| 2,296,749 | Tanner | Sept. 22, 1942 |
| 2,407,648 | Boehm, Jr. | Sept. 17, 1946 |

FOREIGN PATENTS

| Number | Country | Date |
|---|---|---|
| 73,478 | Switzerland | Mar. 16, 1917 |